United States Patent
Miyata et al.

(10) Patent No.: US 7,666,532 B2
(45) Date of Patent: Feb. 23, 2010

(54) FUEL CELL SYSTEM AND METHOD OF STARTING FUEL CELL SYSTEM

(75) Inventors: Koichiro Miyata, Saitama (JP); Kenichiro Ueda, Saitama (JP); Chihiro Wake, Saitama (JP); Jumpei Ogawa, Saitama (JP); Minoru Uoshima, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 440 days.

(21) Appl. No.: 11/289,953

(22) Filed: Nov. 29, 2005

(65) Prior Publication Data

US 2006/0141309 A1 Jun. 29, 2006

(30) Foreign Application Priority Data

Dec. 28, 2004 (JP) .............................. 2004-381340

(51) Int. Cl.
*H01M 8/00* (2006.01)
*H01M 8/04* (2006.01)
(52) U.S. Cl. .............................. 429/13; 429/24; 429/26
(58) Field of Classification Search ........................ None
See application file for complete search history.

(56) References Cited

U.S. PATENT DOCUMENTS 6,896,985 B2 * 5/2005 Horiguchi et al. ............. 429/22
2004/0106026 A1 * 6/2004 Fujita et al. ................... 429/24

FOREIGN PATENT DOCUMENTS

JP 2002-093445 3/2002

* cited by examiner

*Primary Examiner*—Patrick Ryan
*Assistant Examiner*—Muhammad Siddiquee
(74) *Attorney, Agent, or Firm*—Lahive & Cockfield, LLP; Anthony A. Laurentano

(57) ABSTRACT

A reaction gas is supplied to a cathode side of a fuel cell at a flow rate higher than that for a usual operation of the fuel cell to thaw the fuel cell system at startup in a freezing state of the system when the system has experienced a temperature lower than an operation temperature of an anode off-gas. A thawing state of the system is detected on the basis of at least two of temperatures of the anode off-gas, a cathode off gas, and a radiator liquid of the fuel cell to control supplying the reaction gas to the cathode side at a usual operation flow rate. An actual increase rate of the temperature of the anode off-gas is obtained and an increase rate of the temperature of the anode off-gas is calculated from the self-heating value to be compared to determine the thawing state.

6 Claims, 8 Drawing Sheets

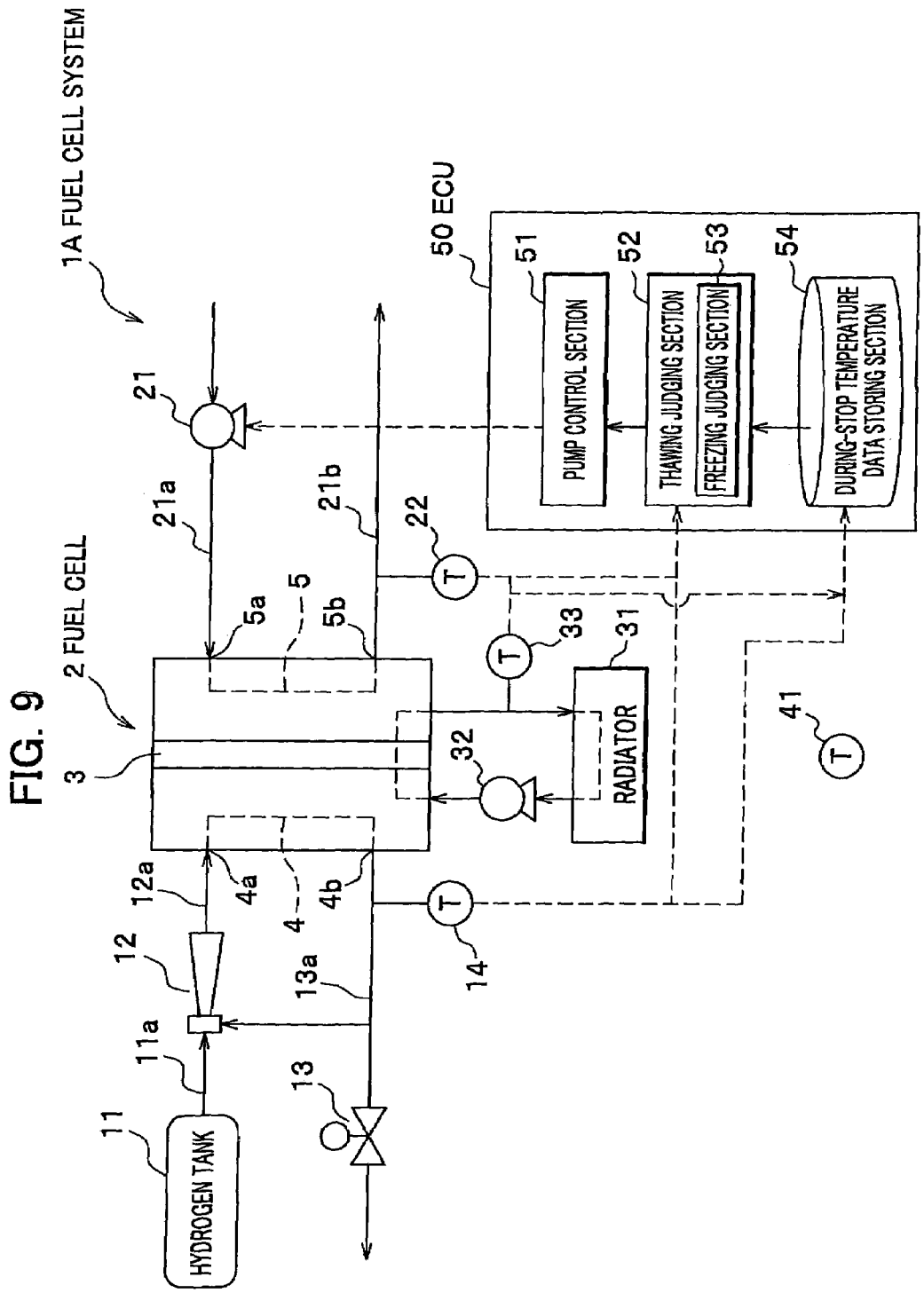

FUEL CELL SYSTEM AND METHOD OF STARTING FUEL CELL SYSTEM

BACKGROUND OF THE INVENTION

1. Field of the Invention

The present invention relates to a fuel cell system and a method of starting a fuel cell system.

2. Description of the Related Art

Fuel cell stacks (also referred to as fuel cells) are known as power sources for vehicles and other electric units. The fuel cell stack includes a plurality of single stacked cells. Further, another fuel cell is known which supplies a humidified oxidizing gas, for example, humidified air to a cathode side to keep an electrolyte membrane of each cell humid. Thus, an amount of water contained in the gas flowing through the fuel cell system becomes large due to water produced by, for example, power generation and humidification. Accordingly, if a temperature of the gas decreases, water contained in the gas becomes condensed. If the fuel cell system is used in winter or at cold regions, the condensed water may freeze in the fuel cell system when a temperature of the fuel cell system becomes lower than an ice point.

Thus, it is desired to develop a technology for preferably operating the fuel cell system at startup of the fuel cell after freezing in accordance with a state of the fuel cell system such as a freezing state and a thawing state (non-freezing state).

Japanese laid-open patent application publication No. 2002-93445 discloses a fuel cell system including a heater for heating the oxidizing gas (air) supplied to the cathode side of the fuel cell, in which the heater is controlled to heat the inside of the fuel cell system when an outside air temperature is subfreezing at the startup.

However, since the fuel cell system judges whether low temperature startup control is required in accordance with the temperature of the system at the startup, when the temperature of the system is high, the low temperature startup control is not done irrespectively of variation of the system temperature during a stop interval. For example, if, after a system temperature reaches a temperature lower than 0° C., the system temperature at the startup is higher than a predetermined temperature, although a part of the fuel cell system is in a freezing state or in an unstable state, the system should start a power generation in the unstable state because the low temperature startup control is not done.

SUMMARY OF THE INVENTION

A first aspect of the present invention provides a fuel cell system and a method of starting a fuel cell system capable of preferably starting the fuel cell system by performing the low temperature startup control if a part of the fuel cell system may be frozen though a system temperature at startup is higher than 0° C.

A second aspect of the present invention provides a fuel cell system including a fuel cell that generates a power through reaction by a reaction gas, comprising: a temperature detection unit for detecting a temperature of the fuel cell system between stop and startup of the fuel cell system; a determining unit for determining whether the temperature reaches a predetermined temperature lower than an operation temperature of the fuel cell system; and a startup control unit for accelerating startup of the fuel cell.

BRIEF DESCRIPTION OF THE DRAWINGS

The object and features of the present invention will become more readily apparent from the following detailed description taken in conjunction with the accompanying drawings in which:

FIG. 9 is a block diagram of the fuel cell system according to a modification derived from the first embodiment of the present invention.

The same or corresponding elements or parts are designated with like references throughout the drawings.

DETAILED DESCRIPTION OF THE INVENTION

FIRST EMBODIMENT

Hereinafter will be described a fuel cell system of a first embodiment according to the present invention with reference to FIGS. 1 to 3.

<<Structure of Fuel Cell System>>

Figure 1:
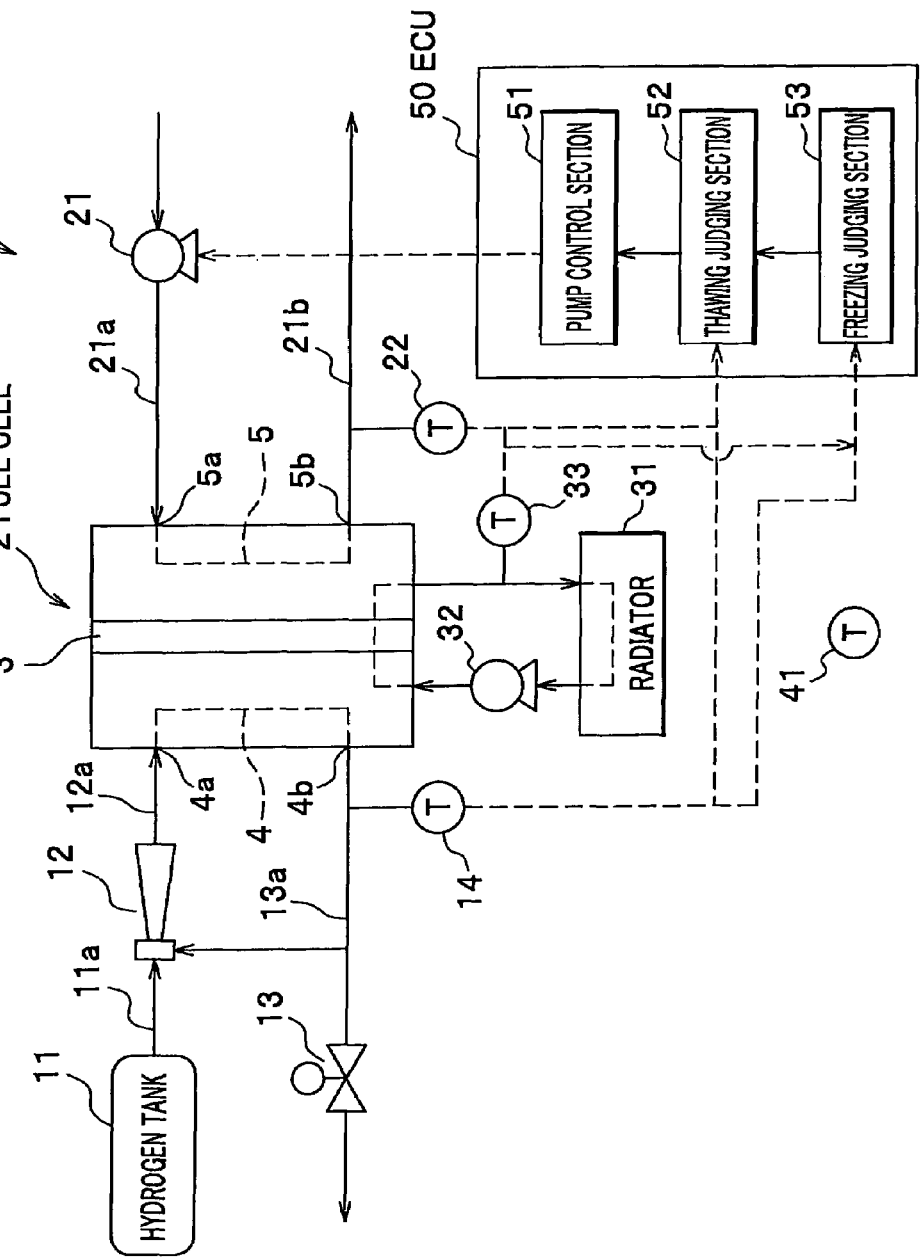
FIG. 1 is a block diagram of a fuel cell system according to a first embodiment of the present invention.

A fuel cell system 1A according to the first embodiment is, as shown in FIG. 1, is mounted on a fuel cell vehicle, in which a fuel cell 2 is preferably operated at startup of the fuel cell vehicle (the fuel cell system 1A) to thaw an inside of the fuel cell system 1A including the fuel cell 2 by self-heating.

The fuel cell system 1A operates the fuel cell 2 under a subfreezing condition when the inside of the fuel cell system 1A freezes and operates the fuel cell 2 under a usual operation condition after thawing or when the inside of the fuel cell system 1A does not freeze. In other words, the fuel cell system 1A preferably operates the fuel cell 2 in accordance with the state of the fuel cell system 1A.

The fuel cell system 1A mainly comprises the fuel cell 2, an anode system for supplying a hydrogen gas (reaction gas) as a fuel gas to an anode side of the fuel cell 2, a cathode system for supplying air (reaction gas) as an oxidizing gas to a cathode side of the fuel cell 2, a cooling system for cooling the fuel cell 2, an outside air temperature sensor 41 for detecting an outside air temperature of the fuel cell vehicle, and an ECU (Electronic Control Unit) 50.

<Fuel Cell>

The fuel cell 2 mainly comprises a plurality of cells stacked with separation with separators, each cell comprising an anode (fuel electrode), a cathode (air electrode), and an electrolyte membrane 3 sandwiched by the anode and the cathode at both surfaces thereof. The separator is formed to have a complicated structure including channels for supplying the reaction gases over entire surfaces of the electrolyte membrane 3 and through holes for supplying the reaction gases to each cell that function as an anode side flow passage 4 and a cathode side flow passage 5. The anode side flow passage 4 allows the hydrogen gas as the fuel gas to pass therethrough to supply the hydrogen gas to the anode of each cell. On the other hand, the cathode side flow passage 5 allows the air as the oxidizing gas to pass therethrough to supply the air to the cathode of each cell.

In each cell, when the hydrogen gas is supplied to the anode, and the air is supplied to the cathode, an electrochemical reaction between the anode and the cathode occurs, generating a predetermined potential difference between the anode and the cathode. The cells are generally connected in series, so that the fuel cell 2 can supply a relatively large power.

<Anode System>

The anode system is arranged at an anode side of the fuel cell 2 to supply and exhaust the hydrogen gas and mainly comprises a hydrogen tank 11, an ejector 12, a purge valve 13, and a temperature sensor 14 (fuel gas temperature detection unit).

First, a hydrogen gas supplying side will be described. The hydrogen tank 11 is connected to the ejector 12 at its downstream side through a tube 11a. The ejector 12 is connected to a hydrogen inlet 4a of the fuel cell 2 through a tube 12a. Thus, the hydrogen gas is supplied to the anode side fluid passage 4 in the fuel cell 2 through the ejector 12 from the hydrogen tank 11. Between the hydrogen tank 11 and the ejector 12, a stop valve (not shown) and a reducing valve (not shown) are provided in the tube 11a in this order toward the ejector 12 to appropriately stop the hydrogen gas and reduce a pressure of the hydrogen gas to a predetermined pressure, respectively.

Next, a hydrogen gas exhaust side will be described. The purge valve 13 is connected to a hydrogen outlet 4b communicated with the anode side flow passage 4 through a tube 13a. The tube 13a branches off along the way, and the branch is connected to the ejector 12 at the hydrogen gas supply side. This efficiently uses the hydrogen gas by closing the purge valve 13 to return (circulate) the hydrogen gas (anode off-gas or fuel gas) exhausted by the fuel cell 2 to the hydrogen gas supply side. On the other hand, when the anode off-gas contains much water, for example, due to a power generation, the purge valve 13 is opened to purge the anode off-gas containing much water from a circulating loop.

The temperature sensor 14 (during-stop temperature detection unit) is arranged in the tube 13a to detect a temperature of the anode off-gas (anode off-gas temperature T1). Further, the temperature sensor 14 is electrically connected to a thawing judging section 52 (thawing judging unit), which can monitor the anode off-gas temperature T1.

The temperature sensor 14 is electrically connected also to a freezing judging section 53 capable of monitoring the anode off-gas temperature T1 (=a temperature of the whole of the fuel cell system 1A) during stop of the operation. More specifically, the temperature sensor 14 operates during stop of the fuel cell system 1A in addition to during thawing judgment (the startup) to detect the anode off-gas temperature T1 during the stop of the fuel cell system 1A. The freezing judging section 53 can monitor the anode off-gas temperature T1 during the stop by starting and stopping reading a signal supplied from the temperature sensor 14 on the basis of a stop command or a start command from the fuel cell system 1A generated, for example, by the turning ON and OFF of an ignition switch (not shown). In the present embodiment, the anode off-gas temperature T1 is regarded as the temperature of the whole of the fuel cell system 1A. However, the present invention is not limited to this. For example, the temperature of the whole of the fuel cell system 1A can be estimated from temperatures detected by the temperature sensors 22 and 23, and the outside air temperature sensor 41 arranged at respective locations of the fuel cell system 1A.

<Cathode System>

The cathode system is arranged at a cathode side of the fuel cell 2 to supply and exhaust the air and mainly comprises a pump 21 (compressor) and temperature sensor 22 (oxidizing gas temperature detection unit).

First, an air supplying side will be described. The pump 21 is connected to an air inlet 5a of the fuel cell 2 through a tube 21a to appropriately take the air at the outside to supply the air to the cathode side channel 5. The pump 21 is electrically connected to a pump control section (reaction gas supply control unit) 51 capable of controlling an amount of the air supplied to the fuel cell 2 by controlling a rotating speed of the pump 21.

Further, a humidifier (not shown) is provided at the tube 21a to humidify the air supplied to the fuel cell 2.

Next, an air exhaust side will be described. A tube 21b is connected to an air outlet 5b of the fuel cell 2 communicated to the cathode side flow passage 5. This allows the air (cathode off gas, oxidizing gas) exhausted by the fuel cell 2 is externally exhausted through the tube 21b.

The temperature sensor 22 is provided in the tube 21b to detect a temperature of the cathode off gas (cathode off gas temperature T2). The temperature sensor 22 is electrically connected to the thawing judgment section 52 (mentioned later) in the ECU 50 to monitor the cathode off temperature T2.

<Cooling System>

The cooling system is provided to cool the fuel cell 2, which generates heat upon power generation, to avoid an excess temperature increase and mainly comprises a radiator 31, a pump 32, a temperature sensor 33 (coolant temperature detection unit). Further tubes are appropriately arranged to circulate a radiator liquid mainly containing ethylene glycol (coolant) between the radiator 31 and the fuel cell 2. The temperature sensor 33 is provided in the tube for allowing the radiator liquid to be expelled from the fuel cell 2 (hereinafter referred to as expelled radiator liquid) to flow therethrough in order to detect a temperature of the expelled radiator liquid (expelled radiator liquid temperature T3). Further, the temperature sensor 33 is electrically connected to the thawing judging section 52 to monitor the expelled radiator liquid temperature T3.

<Outside Air Temperature Sensor>

The outside air temperature sensor 41 is provided at an appropriate location of the fuel cell vehicle. The outside air temperature sensor 41 is not used in the present embodiment. However, as described earlier, it can be used in place of the during-stop temperature detection unit.

<ECU>

The ECU 50 mainly comprises functions of controlling the power generation in the fuel cell 2, monitoring the outside air temperature during the stop of the fuel cell system 1A, judging whether the fuel cell system is in a thawing state at the startup on the basis of the anode off-gas temperature T1 during the stop, and judging whether the whole of the fuel cell system 1A is in a thawing state. The ECU 50 is configured with a CPU, a ROM, a RAM, various interfaces, and other electric circuits to provide the pump control section (reaction gas supplying control unit) 51, the thawing judging section (thawing judging unit) 52, and the freezing judging section (low temperature judging unit) 53 as programs, for example, in the ROM.

[Pump Control Section]

The pump control section 51 is electrically connected to the pump 21 at the cathode side to appropriately control the pump 21 regarding start, stop, and the rotating speed.

To the pump control section 51 are set "usual operation condition" and "subfreezing temperature operation condition", which are switchably used.

Here, "usual operation condition" is a condition where the pump 21 is operated at a usual rotating speed (a predetermined rotating speed that is preset as a rotating speed at the startup) to supply the air (a usual use reaction gas) at a usual flow rate and a usual pressure to allow the fuel cell 2 to usually generate power. On the other hand, "subfreezing temperature operation condition" is a condition where the pump 21 is operated at a rotating speed higher than the usual rotation speed to supply the air (a reaction gas for a low temperature operation) at a flow rate higher than the usual flow rate and a pressure higher than the usual pressure.

As a result, a self-heating value of the fuel cell 2 under the subfreezing temperature operation condition is higher than that under the usual operation condition, so that the pump control section 51 can control the self-heating value of the fuel cell 2 by appropriately switching "usual operation condition" and "subfreezing temperature operation condition".

[Freezing Judging Section/Freezing Judging Function]

The freezing judging section 53 is electrically connected to the temperature sensor 14 for detecting the anode off-gas temperature T1 and has a function of monitoring the anode off-gas temperature T1 during the stop of the fuel cell system 1A detected and supplied from the temperature sensor 14. Further, this freezing judging section 53 has a function of determining on the basis of the anode off-gas temperature T1 supplied from the temperature sensor 14 whether the anode off-gas temperature T1 has reached a subfreezing temperature (predetermined temperature), i.e., whether the anode off-gas temperature Ti has become a temperature below 0° C. Further, the freezing judging section 53 has a function of setting a flag (store "1" as the flag) when the anode off-gas temperature T1 has reached the subfreezing temperature.

[Thawing judging Section/Thawing judging Function]

The thawing judging section 52 refers the judging result from the freezing judging section 53 as to whether the flag has been set, and on the basis of the judging result, instructs the pump control section 51 about which one of "usual operation condition" and "subfreezing temperature operation condition" is to be selected. This can preferably operate the fuel cell 2 under either of "usual operation condition" or "subfreezing temperature operation condition" in accordance with the state of the fuel cell system 1A (a non-freezing state or a freezing state). The thawing judging section 52 is also referred to as a low temperature startup control section.

More specifically, in the first embodiment, the thawing judging section 52 judges (determines) that at least part of the fuel cell system 1A is in the freezing state when the flag is "1" at the startup of the fuel cell system 1A and then, instructs the pump control section 51 about "subfreezing temperature operation condition". On the other hand, when flag is "0" at the startup of the fuel cell system 1A, the thawing judging section 52 determines that the whole of the fuel cell system 1A is in the non-freezing state, and then, instructs the pump control section 51 about "usual operation condition."

The thawing judging section 52 has electrical connections to the temperature sensor 14 for detecting the anode off temperature T1 and to the temperature sensor 33 for detecting the expelled radiator liquid temperature T3. The thawing judging section 52 has a function of determining whether the whole of the fuel cell system 1A has thawed on the basis of the signals from the temperature sensor 14, 22, and 33 (at least two of them) after activating the fuel cell system 1A by instructing the pump control section 51 about "subfreezing temperature operation condition." Further, the thawing judging section 52 has a function of instructing the pump control section 51 to change the operation condition from "subfreezing temperature operation condition" to "usual operation condition."

More specifically, in the first embodiment, the thawing judging section 52 refers at least two temperatures out of the anode off-gas temperature T1, the cathode off gas temperature T2, and the expelled radiator liquid temperature T3 and determines that the whole of the fuel cell system 1A has thawed when these temperatures exceed 0° C. A judgment made from at least two temperatures as mentioned above prevents an erroneous judgment.

<<Operation of Fuel Cell System>>

An operation of the fuel cell system 1A during the stop will be described with reference to FIGS. 1 and 2.

Figure 2:
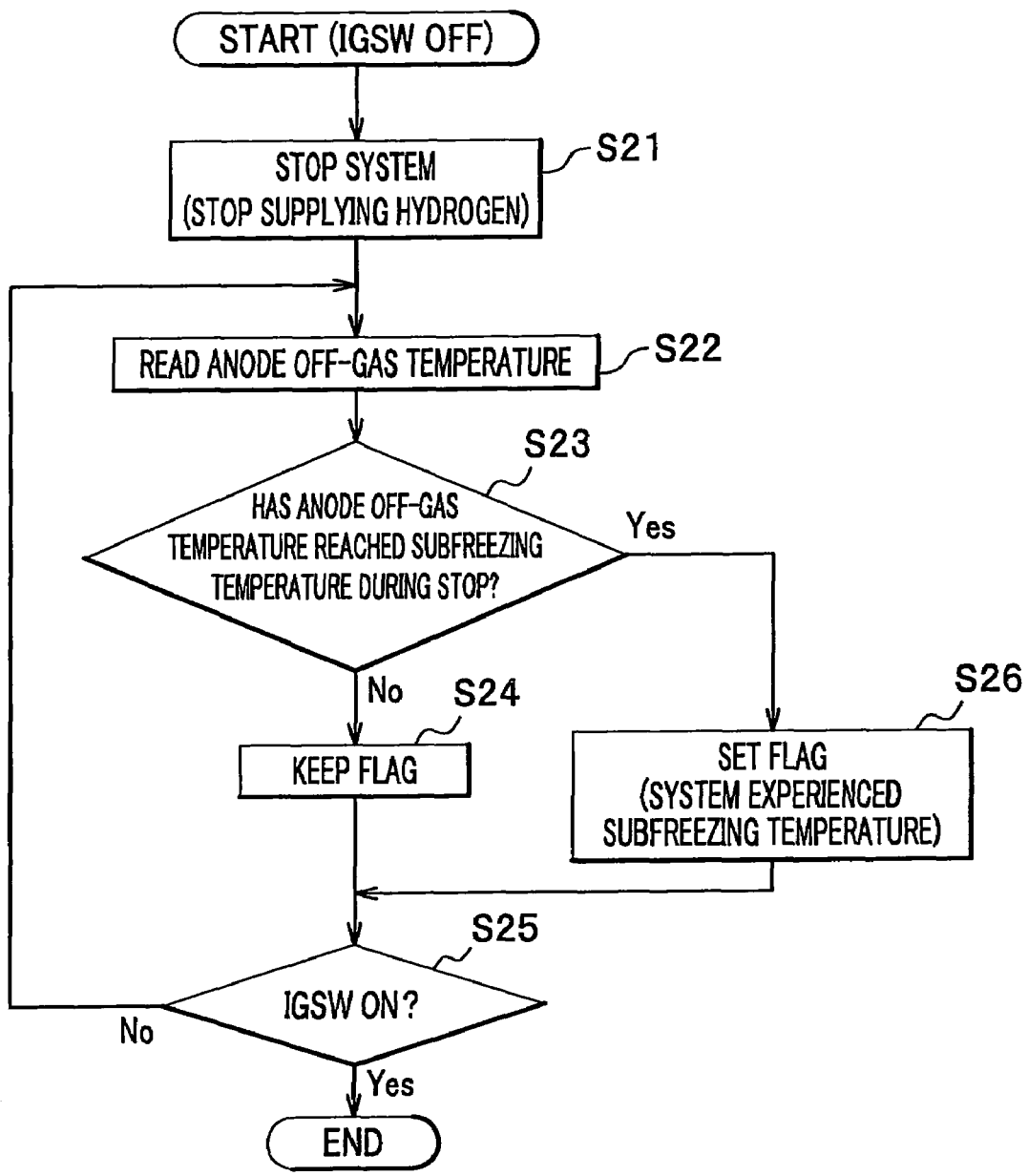
FIG. 2 depicts a flow chart showing an operation during stop of the fuel cell system according to the first embodiment of the present invention.

As shown in FIG. 2, when an ignition switch of the fuel cell vehicle (hereinafter referred to as IGSW) is turned off (start), the ECU 50 stops the fuel cell system 1A by closing the stop valve (not shown) for switching between supplying and cutting-off the hydrogen gas and by stopping the pump 22 (in a step S21). After the step S21, the ECU 50 reads the anode off-gas temperature T1 to supply it to freezing judging section 53 in a step S22.

After the step S22, the freezing judging section 53 determines whether the anode off-gas temperature T1 reaches a subfreezing temperature during the stop of the fuel cell system 1A in a step S23. In the step S23, when the freezing judging section 53 determines that the anode off-gas temperature T1 has not reached a subfreezing temperature (T1 is higher than 0° C.)(No), the freezing judging section 53 leaves the flag unchanged in a step S24 and moves to the next process (a step S25).

In the step S23, when the freezing judging section 53 determines that the anode off-gas temperature T1 has reached a subfreezing temperature (Yes), the freezing judging section 53 sets, in a step S26, the flag indicating that the system has experienced the subfreezing temperature and moves to the next process (the step S25).

In the step S25, the ECU 50 judges (determines) whether the IGSW is turned on. If the IGSW is not turned on (No), the ECU 50 repeats the processing in the steps S22, S23, and S24 (or S26). If the IGSW is turned on (Yes), the ECU 50 ends this process and moves to a routine for starting the system.

A startup operation of the fuel cell system 1A will be described with reference to FIGS. 1 to 3.

Figure 3:
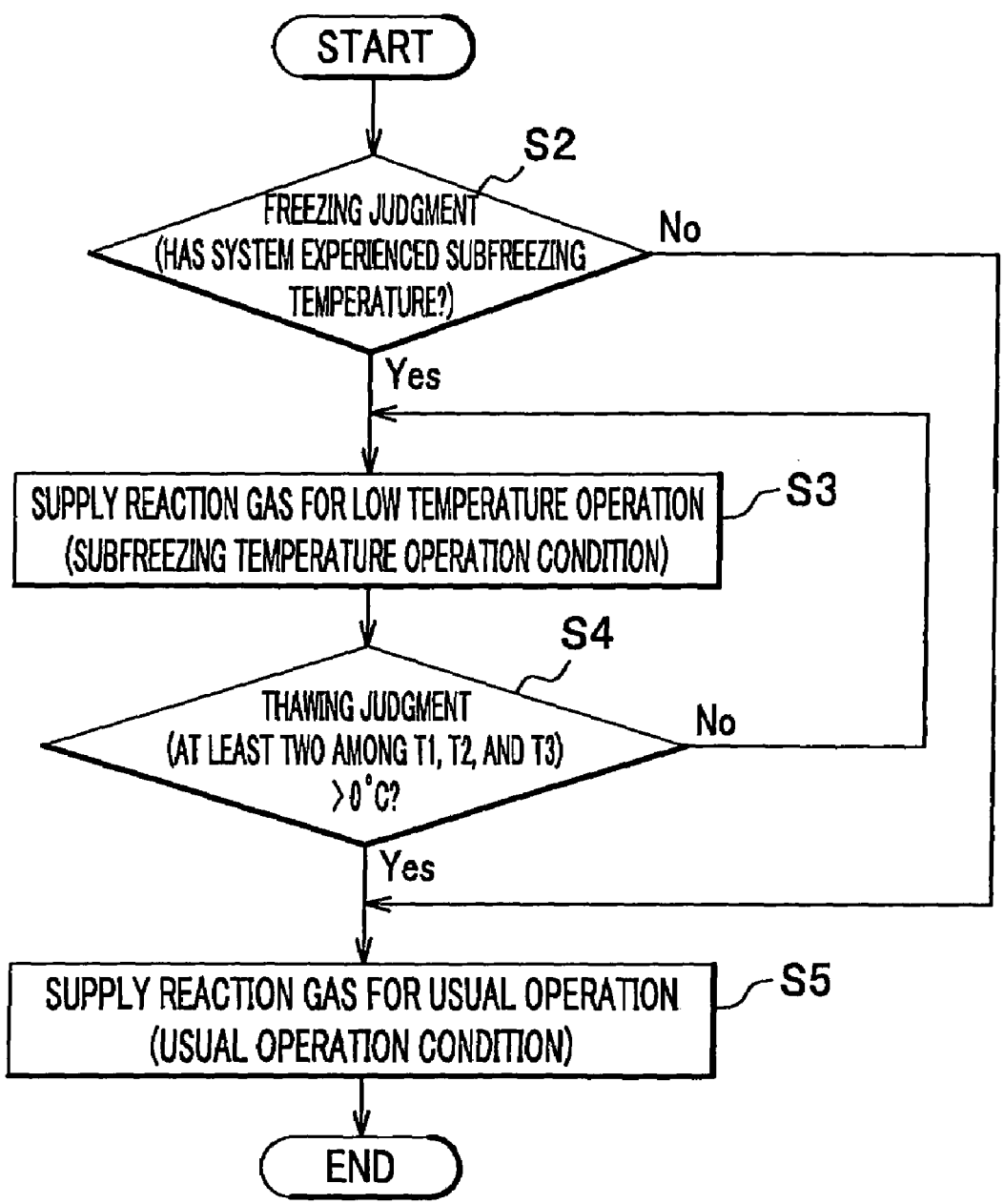
FIG. 3 depicts a flow chart showing an operation at startup according to the first embodiment of the present invention.

As shown in FIG. 3, when having finished the process during the stop of the operation (FIG. 2), the ECU 50 proceeds to a step S2 to perform a freezing judgment. Further, as moving to the starting process, the ECU 50 supplies the hydrogen gas to the anode side of the fuel cell 2 by opening the stop valve (not shown) at the anode side.

<Freezing judgment>

In the step S2, the ECU 50 as the thawing judging section 52 refers the judging result of the freezing judging section 53, i.e., refers whether the flag is "1", and on the basis of the judging result, determines whether at least a part of the fuel cell system 1A has experienced the subfreezing temperature.

More specifically, in the step S2, if the ECU 50 determines, as the thawing judging section 52, that the flag is "1" (Yes), the ECU 50 instructs the pump control section 51 to operate under "subfreezing temperature operation condition" and moves to a step S3. Further, the flag indicating "1" is reset after the judgment of "Yes" in the step S2.

On the other hand, in the step S2, if determining that the flag is "0" (No), namely, if there is no experience of the subfreezing temperature, the thawing judging section 52 determines that the whole of the fuel cell system 1A is in the freezing state, instructing the pump control section 51 about "usual operation condition". After that, the processing proceeds to a step S5.

<Reaction Gas Supply for Low Temperature Operation/Subfreezing Temperature Operation Condition>

In the step S3, the pump control section 51 operates the pump 21 under "subfreezing temperature operation condition". More specifically, the pump control section 51 controls the pump 21 to supply the air (reaction gas for low temperature operation) at the flow rate higher than that of "usual operation condition" with the pressure higher than that for "usual operation condition" to the fuel cell 2. This allows the fuel cell 2 to generate the power higher than that by "usual operation condition". Therefore, the self-heating value of the fuel cell 2 for generating the power under "subfreezing temperature condition" becomes higher than that under "usual operation condition". The high self-heating value rapidly thaws the inside of the fuel cell 2 as well as heat generated by this fuel cell 2 starts thaw of the whole of the fuel cell system 1A.

After the pump control section 51 operates the fuel cell 2 to generate the power under "subfreezing temperature operation condition", the processing proceeds to a step S4.

<Thawing Judgment>

In the step S4, the thawing judging section 52 determines whether the fuel cell system 1A including the fuel cell 2 generates the power under "subfreezing temperature operation condition". More specifically, the thawing judging section 52 refers at least two out of the anode off-gas temperature T1, the cathode off gas temperature T2, and the expelled radiator liquid temperature T3 and if these temperatures exceed 0° C., the thawing judging section 52 determines that the whole of the fuel cell system 1A has thawed.

If determining that the whole of the fuel cell system 1A becomes the thawing state (Yes in the step S4), the thawing judging section 52 instructs the pump control section 51 to change the condition from "subfreezing temperature operation condition" to "usual operation condition", moving to the step S5. On the other hand, if determining that the whole of the fuel cell system 1A has not become the thaw (No in the step S4), the thawing judging section 52 continues the operation of the pump 21 under "subfreezing temperature operation condition".

<Usual Reaction Gas Supply/Usual Operation Condition>

In the step S5, the pump control section 51 operates the pump 21 under "usual operation condition" to supply the air (reaction gas for usual operation) at the usual flow rate and the usual pressure. This operates the fuel cell 2 in a usual condition. Then, the process in the freezing judgment and the thawing judgment for the startup of the fuel cell system 1A finishes.

In the fuel cell system 1A according to the first embodiment, once the anode off-gas temperature T1 reaches the subfreezing temperature during the stop of the fuel cell system 1A, the fuel cell 2 is operated under "subfreezing temperature operation condition". Thus, for example, although only the anode off-gas temperature T1 is not below 0° C. irrespective of freezing at the startup because a part of the fuel cell system 1A freezes due to an experience of the subfreezing temperature during the stop, the startup of the fuel cell system 1A is preferably provided.

Further, at least a part of the fuel cell system 1A freezes at the startup of the fuel cell system 1A, the operation of the fuel cell 2 under "subfreezing temperature operation condition" showing a higher self-heating value rapidly makes the whole of the fuel cell system 1A the thawing state.

Further, because the pump inherently equipped in the general fuel cell system at the cathode side is efficiently used, the fuel cell system 1A can be configured with no special unit such as a heater at the cathode side. In other words, configuration of this fuel cell system 1A does not increase the weight and the size.

Further, if at least a part of the fuel cell system 1A freezes, the fuel cell 2 is preferably operated under "subfreezing temperature operation condition" and if the fuel cell system 1A is in the non-freezing state, the fuel cell 2 can be preferably operated under "usual operation condition".

Further, rapidly switching the condition to "usual operation condition" after the thaw provides supplying the air (reaction gas) to the fuel cell 2 without loss.

SECOND EMBODIMENT

Figure 4:
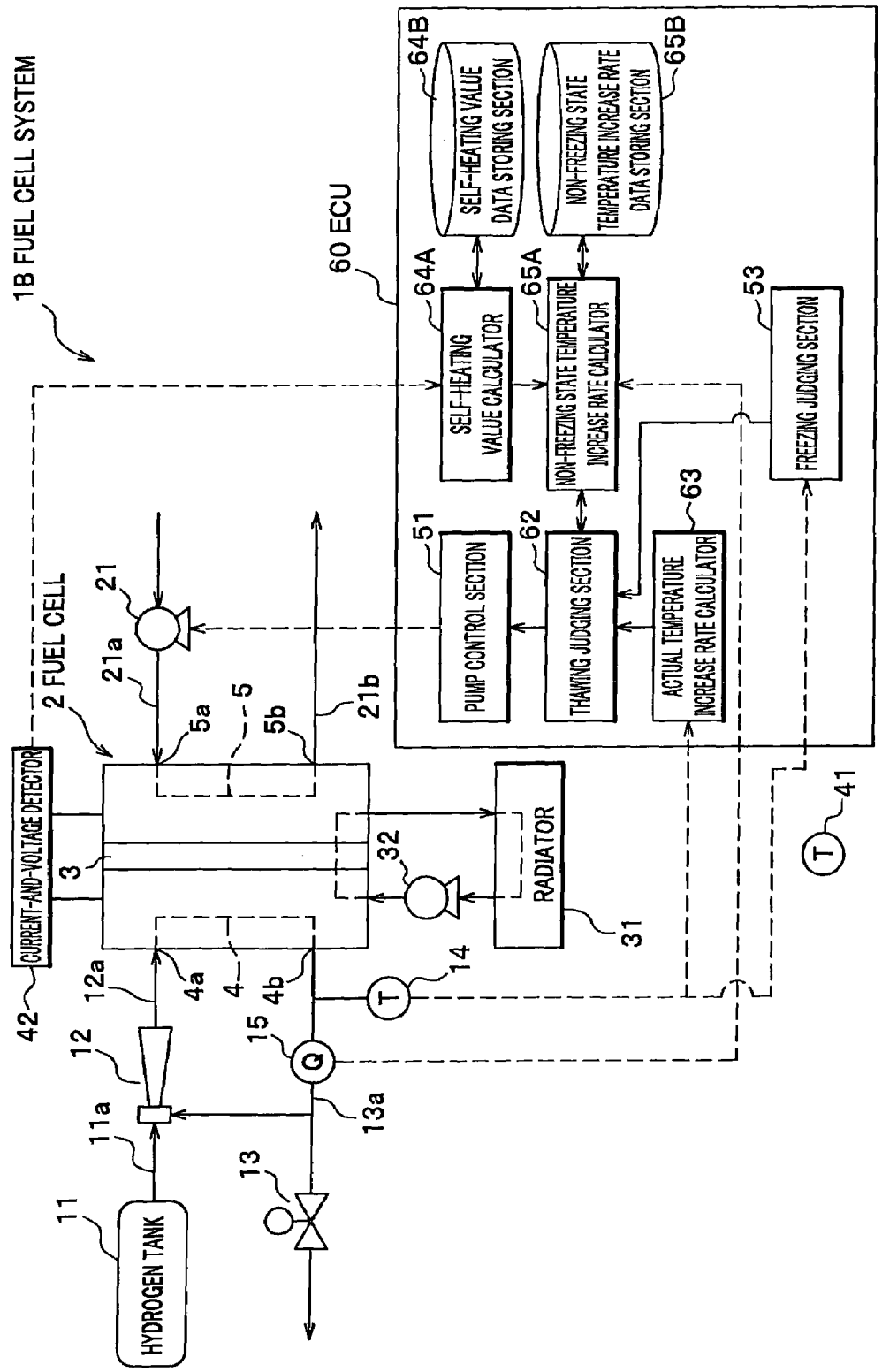
FIG. 4 is a block diagram of the fuel cell system according to a second embodiment of the present invention.
Figure 5:
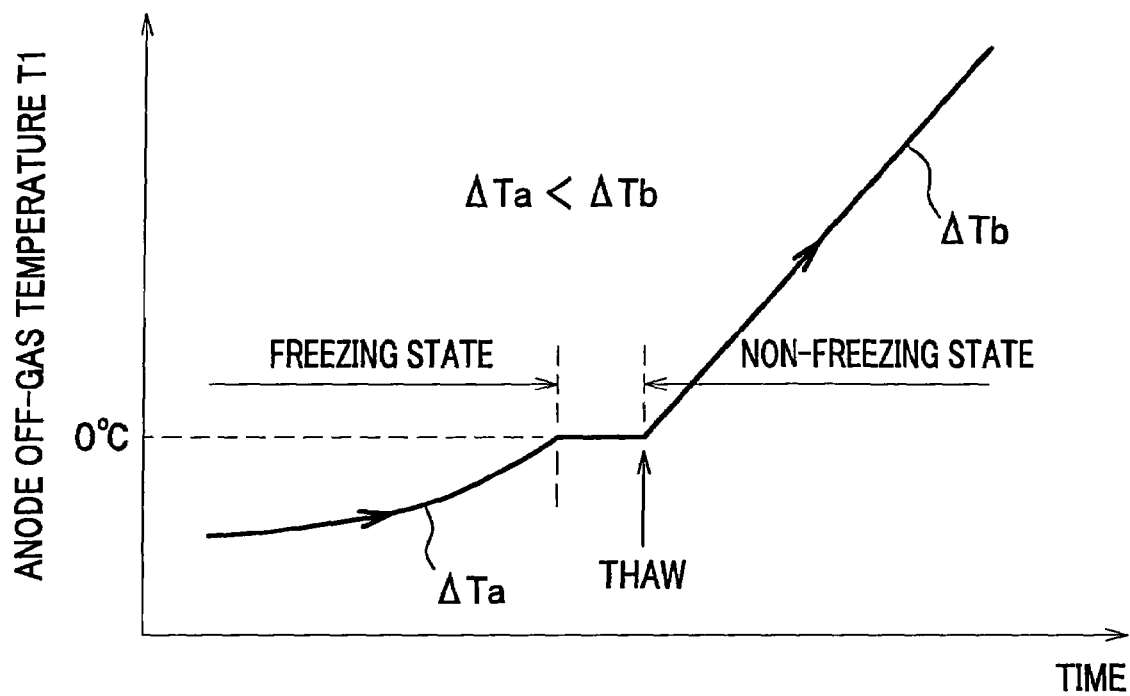
FIG. 5 is a graphical drawing illustrating a variation of a temperature of an anode off-gas around thawing.
Figure 6:
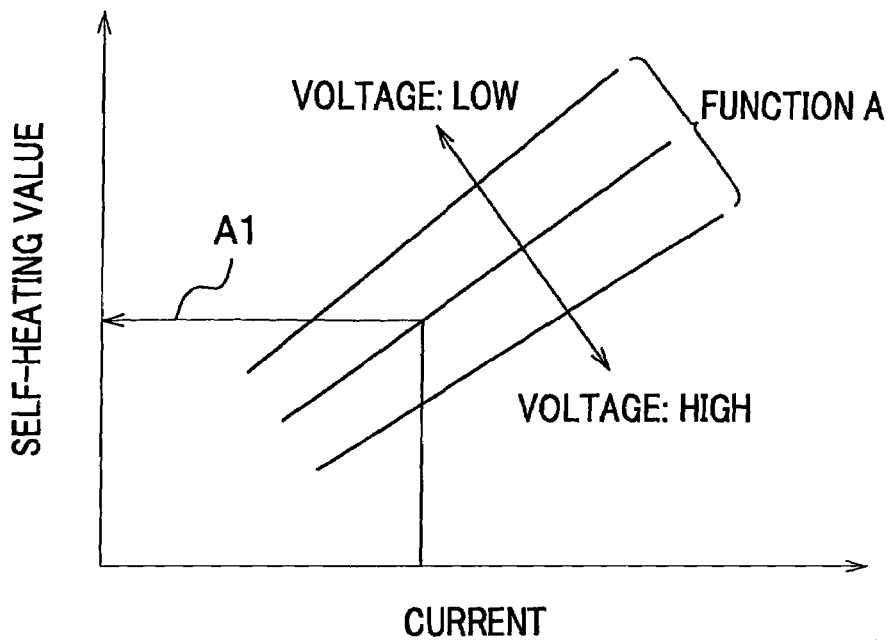
FIG. 6 is a graphical drawing illustrating a variation of an example of self-heating value data for calculating a self-heating value on the basis of an amount of power generation by the fuel cell.
Figure 7:
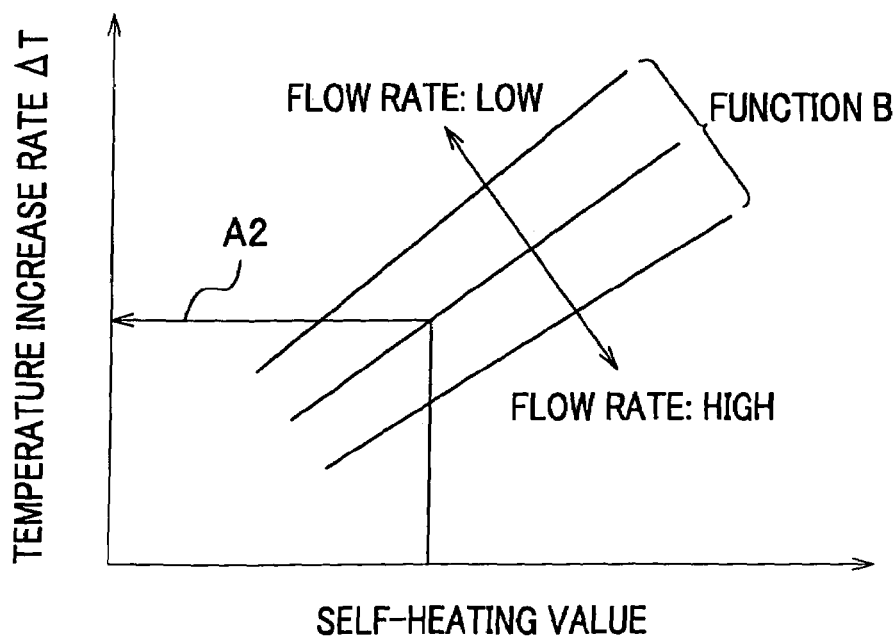
FIG. 7 is a graphical drawing illustrating a variation of an example of non-freezing state temperature increase rate data for calculating a non-freezing state temperature increase rate of the anode off-gas on the basis of a self-heating value of the fuel cell when an inside of the fuel cell is in a non-freezing state.
Figure 8:
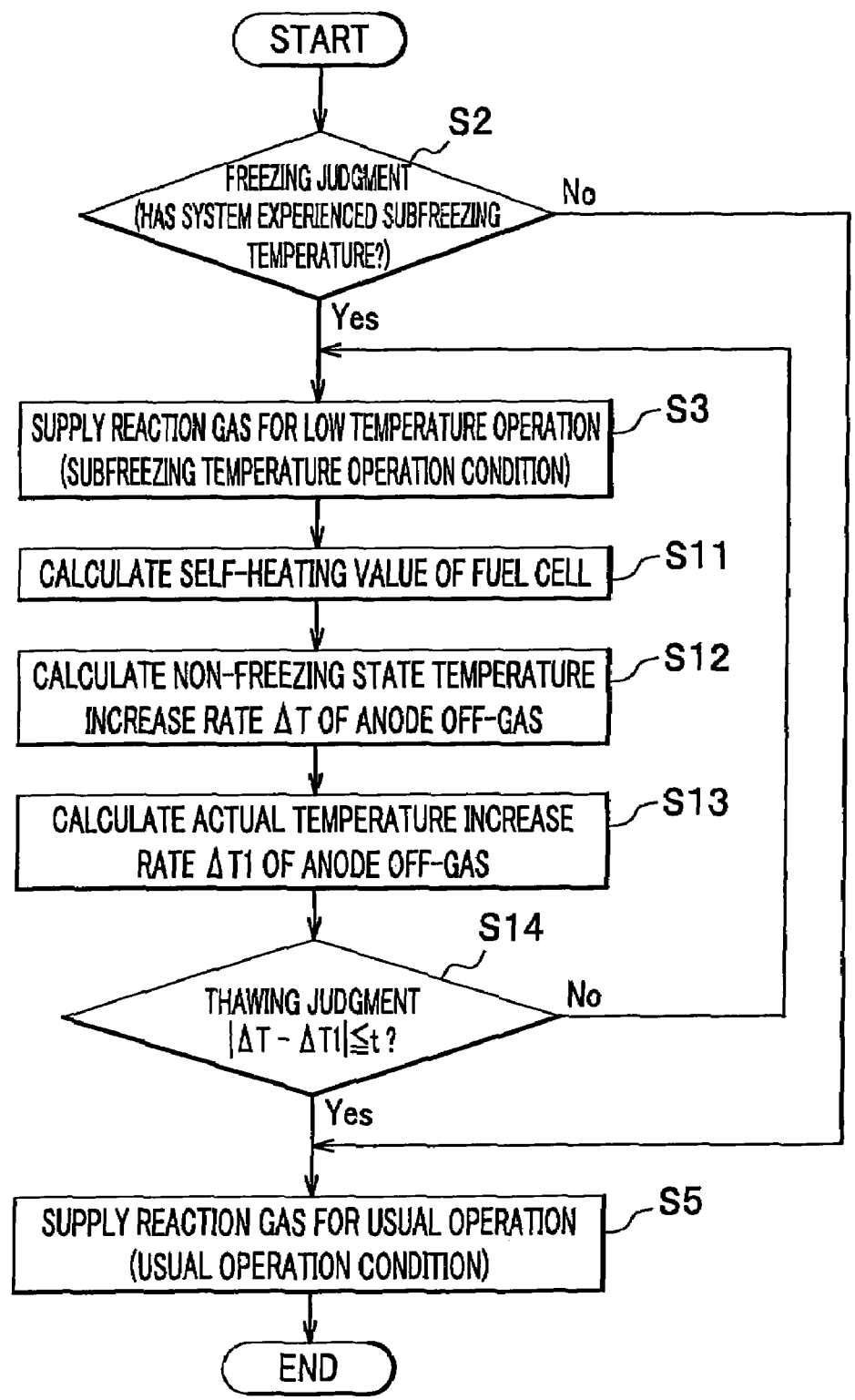
FIG. 8 depicts a flow chart showing a control process at the startup according to the second embodiment of the present invention.

A fuel cell system according to a second embodiment of the present invention will be described with reference to FIGS. 4 to 8. This fuel cell system is provided by modifying the fuel cell system according to the first embodiment. Thus the same parts are designated as the same references and thereby duplicated descriptions are omitted. FIG. 4 illustrates a structure of the fuel cell system according to the second embodiment. FIG. 5 shows a variation in the anode off-gas temperature T1 with time. FIG. 6 shows a variation in a self-heating value with a current intensity. FIG. 7 shows a variation in temperature increase rate with the self-heating value. FIG. 8 shows a startup operation of the fuel cell system according to the second embodiment.

<<Structure of Fuel Cell System>>

A fuel cell system 1B according to the second embodiment comprises an ECU 60 instead of the ECU 50 used in the first embodiment in which the method of judging the thawed condition is different from the first embodiment. The fuel cell system 1B further comprises a flow meter 15, and a current-and-voltage detector 42. In addition, the fuel cell system 1B does not use the temperature sensors 22 and 33 used in the first embodiment.

<<Flow Meter>>

The flow meter 15 is provided in the tube 13a at the anode side to detect a flow rate of the anode off-gas. The flow meter 15 is electrically connected to a non-freezing state temperature increase rate calculator 65A mentioned later, which can monitor the flow rate of the anode off-gas.

<<Current-and-Voltage Detector>>

The current-and-voltage detector 42 detects an amount of the generated electric power by the fuel cell 2, i.e., an output current and an output voltage, and comprises a current meter and a voltage meter which are connected to output terminals of the fuel cell 2. The current-and-voltage detector 42 is connected to a self-heating value calculator 64A capable of monitoring a self-heating value of the fuel cell 2 (the output current and the output voltage). 53

<ECU>

The ECU 60 comprises the pump control section 51, a thawing judging section 62, an actual temperature increase rate calculator 63, the self-heating value calculator 64A, a self-heating value data storing section 64B, the non-freezing state temperature increase rate calculator 65A, a non-freezing state temperature increase rate data storing section 65B, and the freezing judging section 53 as programs.

The pump control section 51 and the freezing judging section 53 are the same as those disclosed in the first embodiment, and thus the duplicated description is omitted.

[Thawing Judging Section/Thawing Judging Function]

The thawing judging section 62 has a thawing judging function and an instructing function for the pump control section 51 on the basis of the judgment result of the thawing judgment or a judgment result by the freezing judging section 53 similarly to the first embodiment. Here, the thawing judgment by the thawing judging section 62 is different from the first embodiment, and thus is described with reference to FIG. 5.

When the hydrogen gas and the air (reaction gas) are supplied to the frozen fuel cell 2, the fuel cell 2 generates the electric power, and the inside of the fuel cell 2 is gradually thawed by heat generated by self-heating. Thus, as shown in FIG. 5, the anode off-gas temperature T1 increases at a temperature increase rate $\Delta Ta$ while the fuel cell 2 is frozen (hereinafter referred to as a temperature increase rate in the freezing state), is approximately constant in a state where heat generated by self-heating is converted into ice-melting equivalent, and increases at a temperature increase rate $\Delta Tb$ in the non-freezing state (hereinafter referred to as temperature increase rate in the non-freezing state). The temperature increase rate in the freezing state $\Delta Ta$ disagrees with the increase rate in the non-freezing state $\Delta Tb$, and there is a relation therebetween, namely, the temperature increase rate in the freezing state $\Delta Ta$<the increase rate in the non-freezing state $\Delta Tb$.

The reason why there is the relation of the temperature increase rate in the freezing state $\Delta Ta$<the increase rate in the non-freezing state $\Delta Tb$ is as follows:

If the fuel cell 2 is in the freeze state and contains ice therein, it is considered that the heat generated with the power generation is absorbed by the separator or the like because the case of the fuel cell 2 also has a low temperature.

Thus, it is considered that the temperature increase rate of the fuel cell 2 by self-heating around 0° C. has a relation of "the temperature increase rate by self-heating in the freezing state (equal to or lower than 0° C.) <the increase rate by self-heating in the non-freezing state (higher than 0° C.)."

Accordingly, the freezing state can be judged as follows:

(1) A relation between the self-heating value of the fuel cell 2 and the anode off-gas temperature T1, and "non-freezing state temperature increase rate $\Delta T$ ($\Delta Tb$)" of the anode off-gas temperature T1 (hereinafter referred to as non-freezing state temperature increase rate data) is previously obtained by generating the power with the fuel cell 2 in the non-freezing state in various conditions. (2) "Non-freezing state temperature increase rate $\Delta T$" of the anode off-gas when the inside of the fuel cell 2 is determined to be in the non-freezing state from the self-heating value is calculated. (3) "Temperature increase rate $\Delta T1$" (hereinafter referred to as actual temperature increase rate $\Delta T1$) of the anode off-gas actually exhausted from the fuel cell 2 is calculated. (4) The fuel cell 2 can be determined to be in the non-freezing state when "non-freezing state temperature increase rate $\Delta T$" is approximately equal to "actual temperature increase rate $\Delta T1$", and to be in the freezing state when "non-freezing state temperature increase rate $\Delta T$" discords with "actual temperature increase rate $\Delta T1$".

Thus, comparing "non-freezing state temperature increases rate $\Delta T$" with "actual temperature increase rate $\Delta T1$" in time base provides judgment that the inside of the fuel cell 2 is thawed when "non-freezing state temperature increases rate $\Delta T$" is approximately equal to "actual measured temperature increase rate $\Delta T1$".

Returning to FIG. 4, on the basis of the theory as mentioned above, the thawing judging section 62 has a function of determining whether the inside of the fuel cell 2 is thawed or not by comparing "actual temperature increase rate $\Delta T1$" calculated by the actual temperature increase rate calculator 63 with "non-freezing state temperature increases rate $\Delta T$" calculated by "non-freezing state temperature increase rate calculating section 65A.

More specifically, in the second embodiment, the thawing judging section 62 is set to determine that the inside of the fuel cell 2 is thawed when "non-freezing state temperature increases rate $\Delta T$" is approximately equal to "actual measured temperature increase rate $\Delta T1$", i.e., a difference between "non-freezing state temperature increases rate $\Delta T$" and "actual measured temperature increase rate $\Delta T1$" is equal to or lower than a threshold t (t≈0) (see a step S14 in FIG. 8).

[Actual Temperature Increase Rate Calculator]

The actual temperature increase rate calculator 63 is electrically connected to the temperature sensor 14 for detecting the anode off-gas temperature T1 to calculate "actual temperature increase rate $\Delta T1$" of the anode off-gas actually exhausted from the fuel cell 2. "Actual temperature increase rate $\Delta T1$" is sent to the thawing judging section 62.

[Self-Heating Value Calculator and Self-heating Value Data Storing Section]

The self-heating value calculating section 64A and the self-heating value data storing section 64B calculate the self-heating value of the fuel cell 2 on the basis of an amount of electric power generated by the fuel cell 2 (current and voltage).

More specifically, the self-heating value calculator 64A is electrically connected to the current-and-voltage detector 42 to monitor the amount of the electric power generated by the fuel cell 2 and further electrically connected to a self-heating value data storing section 64B to refer self-heating value data mentioned later at need.

The self-heating value data storing section 64B stores "self-heating value data" obtained, for example, by a preliminary test. "Self-heating value data" is data relating the amount of the electric power (more specifically, the current and the voltage) when the fuel cell 2 in the non-freezing state generates the electric power with the self-heating value of the fuel cell 2 corresponding to the amount of the electric power generated in this condition. For example, data is shown as functions A in FIG. 6. Further, as shown in FIG. 6, there is a relation that the higher current and the lower voltage the fuel cell 2 generates, the higher the self-heating value of the fuel cell 2.

Thus, the self-heating value calculator 64A can calculate the self-heating value of the fuel cell 2 on the basis of the amount of the power generated by the fuel cell 2 (see an arrow Al in FIG. 6).

[Non-Freezing State Temperature Increase Rate Calculator and Non-Freezing State Temperature Increase Rate Data Storing Section]

The non-freezing state temperature increase rate calculator 65A and the non-freezing state temperature increase rate data storing section 65B are a part (non-freezing state temperature increase rate calculating unit) for calculating "non-freezing state temperature increase rate $\Delta T$" of the anode off-gas when the inside of the fuel cell 2 is in the non-freezing state on the basis of the self-heating value of the fuel cell 2.

More specifically, the non-freezing state temperature increase rate calculator 65A is electrically connected to the self-heating value calculator 64A, the non-freezing state temperature increase data storing section 65B, and the thawing judging section 62. Further, the non-freezing state temperature increase rate calculator 65A is electrically connected to the flow rate meter 15 to monitor a flow rate of the anode off-gas.

The non-freezing state temperature increase rate data storing section 65B stores "non-freezing state temperature increase rate data" obtained, for example, by the preliminary test. "Non-freezing state temperature increase rate data" indicates a relation among the self-heating value of the fuel cell 2, the non-freezing state temperature increase rate $\Delta T$ of the anode off-gas, and the flow rate of the anode off-gas. For example, "non-freezing state temperature increase rate data" is shown as functions B in FIG. 7. Further, FIG. 7 shows a relation in which the lower the flow rate of the anode off-gas and the greater the self-heating value of the fuel cell 2, the higher the non-freezing state temperature increase rate $\Delta T$ of the anode off-gas.

Thus, the non-freezing state temperature increase rate calculator 65A can calculate "non-freezing state temperature increase rate $\Delta T$ of the anode off-gas" when the inside of the fuel cell 2 is in the freezing state on the basis of the self-heating value of the fuel cell 2 calculated by the self-heating value calculator 64A and the flow rate of the anode off-gas with reference to "non-freezing state temperature increase rate data" in the non-freezing state temperature increase rate data storing section 65B. The calculated "non-freezing state temperature increase rate $\Delta T$ of the anode off-gas" is supplied to the thawing judging section 62.

<<Operation of Fuel Cell System>>

The operation of the fuel cell system 1B according to the second embodiment will be described, mainly referring to FIG. 8.

When the ignition switch IGSW (not shown) of the fuel cell vehicle is turned ON (start), the processing in the ECU 60 proceeds to the step S2 to have the freezing state judgment.

<Freezing State Judgment>

In the step S2, the thawing judging section 62 determines whether the inside of the fuel cell 2 (at least a part of the fuel cell system 1B) is in the freezing state on the basis of the judging result of the freezing state judging section 66 (whether the fuel cell 2 has experienced a subfreezing temperature).

If the thawing judging section 62 determines that it has experienced a subfreezing temperature (Yes in the step S2), the thawing judging section 62 instructs the pump control section 51 to operate under "subfreezing temperature operation condition" and moves to the step S3. If the thawing judging section 62 judges (determines) that it has experienced no subfreezing temperature (No in the step S2), the thawing judging section 62 instructs the pump control section 61 to operate under "usual operation condition" and moves to the step S5. If the flag is "1" in the step S2, the flag is reset to "0" after the judgment of "Yes" like the first embodiment.

<Reaction Gas Supply for Low Temperature Operation/Subfreezing Temperature Operation Condition>

In the step S3, the pump control section 51 operates the pump 21 in "subfreezing temperature operation condition" like the first embodiment.

After that, the processing proceeds to a step S11.

<Calculating Self-Heating Value>

In the step S11, the self-heating value calculator 64A calculates the self-heating value of the fuel cell 2 from the amount of a power (current and voltage) detected by the current-and-voltage detector 42 with reference to the self-heating value data in the self-heating value data storing section 64B (see an arrow Al in FIG. 6).

Next, the processing proceeds to a step S12.

<Calculating Non-freezing State Temperature Increase Rate $\Delta T$>

In the step S12, the non-freezing state temperature increase rate calculator 65A calculates "non-freezing state temperature increase rate $\Delta T$" of the anode off-gas when the inside of the fuel cell 2 is in the non-freezing state on the basis of the self-hating value of the fuel cell 2 with reference to the flow rate of the anode off-gas (see an arrow A2 in FIG. 7).

The processing proceeds to a step S13.

<Calculating Actual Temperature Increase Rate $\Delta T1$>

In the step S13, the actual temperature increase rate calculator 63 calculates "actual temperature increase rate $\Delta T1$" of the anode off-gas actually exhausted on the basis of the actual anode off-gas temperature T1.

The processing proceeds to a step S14.

<Thawing Judgment>

In the step S14, the thawing judging section 62 judges (determines) that the inside of the fuel cell 2 is thawed. More specifically, when a difference between "non-freezing state temperature increase rate $\Delta T$" and "actual temperature increase rate $\Delta T1$" is equal to or lower than the threshold t (approximately zero), the thawing judging section 62 judges (determines) that the inside of the fuel cell 2 is thawed. Further, this thawing state of the inside of the fuel cell 2 is considered as a thaw of the whole of the fuel cell system 1B in the second embodiment.

If the thawing judging section 62 judges (determines) that "inside of the fuel 2 is thawing" (Yes in the step S14), the thawing judging section 62 instructs the pump control section 61 to change the operation condition from "subfreezing state temperature operation condition" to "unusual operation condition" and moves to the step S5. If the thawing judging section 62 judges (determines) that "inside of the fuel 2 is not thawing" (No in the step S14), the thawing judging section 62 instructs the pump control section 51 to continue the operation condition of "subfreezing state temperature operation condition".

<Reaction Gas Supply for Usual Condition/Usual Operation Condition>

In the step S5, the pump 21 is operated in "usual operation condition" like the first embodiment to supply the air (reaction gas for usual condition) at the usual flow rate and the usual pressure. After that, the freezing judgment and the thawing judging at the startup of the fuel cell 2 end.

As mentioned above, in the fuel cell system 1B according to the second embodiment, although the anode off-gas having a relatively high temperature is exhausted instantaneously, the thawing judgment tends not to be subject to the influence because the thawing judgment detects the temperature increase rate of the anode off-gas. Thus, the temperature sensors 22 and 23 and accompanied cables which are necessary in the first embodiment can be omitted. This reduces the number of parts such as the temperature sensors, so that the fuel cell system 1B can be simplified.

The present invention is described with the above-mentioned preferred embodiments. However, the present invention is not limited to the preferred embodiments, but can be modified as follows:

In the first and second embodiments, the temperature sensor 14 for detecting the temperature of the anode off-gas as the temperatures of the fuel cell systems 1A and 1B is used to detect the temperature during the stop. However, the sensor for detecting the temperature during the stop is not limited to this. For example, a temperature sensor attached to a case (not shown) of the fuel cell 2, the temperature sensors 22 and 23 arranged at respective places of the fuel cell system 1A, and the ambient temperature sensor 41 are available.

In the second embodiment, the thawing judgment is performed by comparing "non-freezing state temperature increase rate ΔT" with "actual temperature increase rate ΔT1". However, this invention is not limited to this. For example, the thawing judgment may be performed by comparing "non-freezing state temperature increase rate" with "actual temperature increase rate" of, for example, the air (oxidizing agent) exhausted from the fuel cell 2 and the radiator liquid (coolant).

In the above-mentioned embodiments, the present invention is applied to the fuel cell systems 1A and 1B mounted on a fuel cell vehicle. However, this invention is not limited to this. For example, the present invention is applicable to a fuel cell system for home use.

In the first embodiment, the temperature sensor 14 is operated both at the startup and the stop of the fuel cell system 1A. However, the present invention is not limited to this. For example, the thawing judgment is performed with only two temperature sensors 22 and 33. This allows the temperature sensor 14 to be operated only at the stop of the fuel cell system 1A. In this case, the temperature 14 can be turned on and off in response to an OFF signal and/or an ON signal of the IGSW.

In the above-described embodiments, the freezing judgment section 53 judges (determines) whether the fuel cell systems 1A and 1B have experienced subfreezing temperatures during the stop thereof, and at the start, the thawing judging section 52 performs the freezing judgment with reference to the judgment by the freezing judging section 53. However, the present invention is not limited to this. For example, FIG. 9 shows a structure in which the structure of the first embodiment is partially modified. In FIG. 9, a during-stop temperature data storing section 54 is added to accumulate and store the anode off-gas temperature during the stop. Further, the thawing judgment section 52 is made to include the function of the freezing judgment section 53. This provides the freezing judgment on the bases of the accumulated data of the temperature in the during-stop temperature data storing section 54. This configuration allows the temperatures detected by the temperature sensor 14 to be stored in the during-stop temperature data storing section 54, simplifying the control during the stop. Thus, power consumption during the stop can be suppressed more.

Further, in the embodiments, the predetermined temperature is a subfreezing temperature. However, the present invention is not limited to this, but the predetermined temperature may be a temperature at which there is a possibility in that the fuel cell starts operation unstably at a next startup of the fuel cell system.

at which the fuel cell may start unstably at the next startup (temperatures lower than the system temperature during usual power generation).

In the first and second embodiments, "temperature of the fuel cell system" means "temperature of the fuel cell system itself (temperature(s) at a part of or a plurality of places of the fuel cell system). Further, if the outside air temperature is regarded as the temperature of the fuel cell system, "temperature of the fuel cell system" includes the outside air temperature. Further, the low temperature judgment may be done at suitable timing or periodically done with, for example, a timer. Further, when the temperature is stored in the during-stop temperature data storing section 54, the low temperature judgment may be done with the accumulated in during-stop temperature data storing section 54 at the startup.

The low temperature judgment is repeatedly done to determine whether the fuel cell system reached the predetermined temperature lower than the usual operation temperature and then stores the result. After that, at the startup of the fuel cell system, if the result indicates that the fuel cell system has experienced the predetermined temperature, for example, a pressure and a flow rate of the reaction gas at the cathode side are increased, and a pressure of the reaction gas at the anode side may be increased. When the result shows that the system has not experienced the predetermined temperature, the low temperature startup operation is not done, but the usual operation is done.

Storing the temperature in the during-stop temperature data storing section 54 during the stop of the fuel cell allows the fuel system not to perform the judgment because the judgment is done at the startup with reference to the during-stop temperature data storing section 54.

The temperature detected by the temperature sensor 33 that detects the temperature of the coolant is supplied to the freezing judging section 53 in FIG. 1 and to the during-stop temperature data storing section 54 in FIG. 9. Thus, the freezing (low temperature) judgment can be done with the temperature of the coolant.

The invention claimed is:

1. A method of starting a fuel cell system including a fuel cell for generating an electric power by reaction between a fuel gas and an oxidizing gas, comprising the steps of:
   (a) detecting a temperature of the fuel cell during a time period from stop to startup of the fuel cell system;
   (b) determining whether the temperature of the fuel cell system reaches a predetermined temperature which is lower than an operation temperature of the fuel cell;
   (c) determining whether the fuel cell system has experienced a freezing temperature on the basis of the temperature detected by the step (a); and
   (d) accelerating the startup of the fuel cell when the temperature of the fuel cell system reaches the predetermined temperature during the time period by supplying the oxidizing gas at a flow rate and a pressure that are higher than a flow rate and a pressure at the operation temperature of the fuel cell, respectively.

2. The method as claimed in claim 1, further comprising the step of accumulatively storing the temperature detected by the step (a), wherein in the step (b) it is determined whether the temperature of the fuel cell system reaches the predetermined temperature during the time period on the basis of the stored temperature.

3. The method as claimed in claim 1, wherein the predetermined temperature is a temperature at which there is a possibility in that the fuel cell starts operation unstably at a next startup of the fuel cell system.

4. The method as claimed in claim 1, wherein the predetermined temperature is a freezing point.

5. The method as claimed in claim 1, wherein the step (a) comprises the step of detecting a temperature of the reaction gas exhausted from the fuel cell as the temperature of the fuel cell system.

6. The method as claimed in claim 1, wherein the fuel cell system comprises: a coolant passage that allows a coolant for cooling the fuel cell to flow therethrough, and the step (a) comprising the step of detecting a temperature of the coolant as the temperature of the fuel cell system.

* * * * *

UNITED STATES PATENT AND TRADEMARK OFFICE
CERTIFICATE OF CORRECTION

PATENT NO. : 7,666,532 B2  Page 1 of 1
APPLICATION NO. : 11/289953
DATED : February 23, 2010
INVENTOR(S) : Miyata et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1021 days.

Signed and Sealed this

Twenty-eighth Day of December, 2010

David J. Kappos
*Director of the United States Patent and Trademark Office*